United States Patent
Yoshikawa et al.

(10) Patent No.: US 6,278,362 B1
(45) Date of Patent: Aug. 21, 2001

(54) DRIVING STATE-MONITORING APPARATUS FOR AUTOMOTIVE VEHICLES

(75) Inventors: Kenji Yoshikawa; Katsuhisa Tanaka; Kouichi Kojima, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 08/453,496

(22) Filed: May 30, 1995

(30) Foreign Application Priority Data

Jan. 12, 1995 (JP) .................................................. 7-019642

(51) Int. Cl.[7] .................................................. B60Q 1/00
(52) U.S. Cl. ........................ 340/439; 340/438; 340/576
(58) Field of Search ........................ 364/424.01, 424.04, 364/424.05, 424.1, 443, 444; 340/439, 441, 936, 576, 438, 465, 463, 901; 180/141, 142, 272

(56) References Cited

U.S. PATENT DOCUMENTS

| | | | |
|---|---|---|---|
| 4,412,594 | * | 11/1983 | Furukawa et al. .................. 180/142 |
| 4,463,347 | * | 7/1984 | Seko et al. .......................... 340/576 |
| 4,706,771 | * | 11/1987 | Kawabe et al. ..................... 180/142 |
| 4,718,685 | * | 1/1988 | Kawabe et al. ..................... 180/142 |
| 4,773,012 | * | 9/1988 | Ito et al. .............................. 180/142 |
| 4,840,389 | * | 6/1989 | Kawabe et al. ................. 364/424.05 |
| 4,996,657 | * | 2/1991 | Shiraishi et al. ..................... 340/465 |
| 5,001,636 | * | 3/1991 | Shiraishi et al. ..................... 180/142 |
| 5,162,997 | * | 11/1992 | Takahashi ......................... 364/424.1 |
| 5,172,785 | * | 12/1992 | Takahashi ...................... 364/424.05 |
| 5,335,176 | * | 8/1994 | Nakamura ..................... 364/424.05 |
| 5,345,385 | * | 9/1994 | Zomotor et al. ..................... 180/142 |
| 5,446,657 | * | 8/1995 | Ikeda et al. ................... 364/424.05 |

FOREIGN PATENT DOCUMENTS

| | | |
|---|---|---|
| 3217362 | 9/1991 | (JP) . |
| 4303007 | 10/1992 | (JP) . |
| 585221 | 4/1993 | (JP) . |

* cited by examiner

*Primary Examiner*—Van T. Trieu
(74) *Attorney, Agent, or Firm*—Carrier, Blackman & Associates, P.C.; Joseph P. Carrier; William D. Blackman (57) ABSTRACT

A driving state-monitoring apparatus for an automotive vehicle detects a behavior parameter indicative of an amount of behavior related to at least one of yawing movement and lateral movement of the automotive vehicle, and a vehicle speed of the automotive vehicle. A behavior reference parameter is set based on changes in the behavior parameter. A lateral deviation behavior amount of the automotive vehicle is calculated based on the behavior parameter, the behavior reference parameter, and the speed of the automotive vehicle. It is determined whether or not the driving state of the driver is normal, based on the lateral deviation behavior amount. Responsive to a determination that the driving state of the driver is not normal, it is determined that the driving state of the driver is abnormal, and a warning is given to the driver and/or a vehicle speed reduction is effected.

20 Claims, 8 Drawing Sheets

FIG.1

*FIG.2A* YAW RATE YR

*FIG.2B* YAW ANGLE YA

— DATA OF YAW ANGLE
···· REFERENCE LINE

*FIG.2C* MODIFIED YAW ANGLE YAM

*FIG.2D* LATERAL DEVIATION DIFFERENTIAL QUANTITY DYK

*FIG.2E* LATERAL DEVIATION YK

|  | $\sigma DIF > \sigma TH$ | $\sigma DIF \leq \sigma TH$ |
|---|---|---|
| $\Delta DIFAVE > \Delta DIFTH$ | C | D |
| $\Delta DIFAVE \leq \Delta DIFTH$ | B | A |

DRIVING STATE-MONITORING APPARATUS FOR AUTOMOTIVE VEHICLES

BACKGROUND OF THE INVENTION

1. Field of the Invention

This invention relates to a driving state-monitoring apparatus for automotive vehicles, which monitors the driving state of the driver of the automotive vehicle, and gives an alarm, if necessary.

2. Prior Art

Conventionally, a driving state-monitoring apparatus has been proposed e.g. by Japanese Laid-Open Patent Publication (Kokai) No. 5-85221, which estimates a delay in response of a driver of an automotive vehicle and the difference between the actual position of the vehicle and a lane on which the vehicle is traveling (reference position of the vehicle in the lane), based on an amount of steering of the vehicle performed by the driver and the vehicle speed, and compares the estimated delay in response and the estimated difference with respective reference values to be assumed during normal driving states of the driver, to thereby check the driving state of the driver e.g. for abnormal steering caused by a doze or lowered driving ability of the driver resulting from his fatigue.

However, since the proposed driving state-monitoring system calculates or estimates the difference between the actual position of the vehicle and the lane on which the vehicle is traveling (reference position in the lane), based on the amount of steering of the vehicle performed by the driver and the vehicle speed, but not based on physical amounts directly related to behavior of the vehicle. As a result, an error can be produced in the calculated difference due to conditions of the road surface (e.g. irregularities and gradient of the road surface), a difference in driving skill between individual drivers (e.g. between a beginner and a skilled driver), and so forth, which results in degraded accuracy of determination of the driving state of the driver.

SUMMARY OF THE INVENTION

It is an object of the invention to provide a driving state-monitoring apparatus for an automotive vehicle, which is capable of more accurately grasping behavior of the vehicle, to thereby determine the driving state of the driver with enhanced accuracy.

To attain the above object, the present invention provides a driving state-monitoring apparatus for an automotive vehicle, for monitoring a driving state of a driver of the automotive vehicle, comprising:

behavior parameter-detecting means for detecting a behavior parameter indicative of an amount of behavior related to at least one of yawing movement and lateral movement of the automotive vehicle;

vehicle speed-detecting means for detecting a speed of the automotive vehicle;

behavior reference parameter-setting means for setting a behavior reference parameter based on changes in the behavior parameter;

lateral deviation behavior amount-calculating means for calculating a lateral deviation behavior amount of the automotive vehicle, based on the behavior parameter, the behavior reference parameter, and the speed of the automotive vehicle;

driving state-determining means for determining whether or not the driving state of the driver is normal, based on the lateral deviation behavior amount; and abnormality-determining means responsive to a determination by the driving state-determining means that the driving state of the driver is not normal, for determining that the driving state of the driver is abnormal.

Preferably, the driving state-monitoring apparatus includes lane changing intention-determining means for determining whether or not the driver intends to change a lane on which the automotive vehicle is traveling, and the abnormality-determining means determines that the driving state of the driver is abnormal, when it is determined by the lane changing intention-determining means that the driver does not intend to change the lane, and at the same time it is determined by the driving state-determining means that the driving state of the driver is not normal.

More preferably, the driving state-determining means determines whether or not the driving state of the driver is normal, based on a plurality of data obtained at different measuring time points.

Also preferably, the driving state-monitoring apparatus includes control means for causing the behavior reference parameter-setting means to again set or correct the behavior reference parameter, depending on variation in the lateral deviation behavior amount calculated by the lateral deviation behavior amount-calculating means.

Preferably, the driving state-monitoring apparatus includes alarm means responsive to the determination by the abnormality-determining means that the driving state of the driver is abnormal, for giving an alarm.

More preferably, the driving state-monitoring apparatus includes vehicle speed-limiting means responsive to the determination by the abnormality-determining means that the driving state of the driver is abnormal, for limiting the speed of the automotive vehicle.

Alternatively, the automotive vehicle includes equipment installed on the automotive vehicle for directly acting on the driver, the apparatus including vehicle equipment control means responsive to the determination by the abnormality-determining means that the driving state of the driver is abnormal, for controlling the equipment.

The above and other objects, features, and advantages of the invention will become more apparent from the following detailed description taken in conjunction with the accompanying drawings.

BRIEF DESCRIPTION OF THE DRAWINGS

FIG. 2A to FIG. 2E are diagrams showing changes in detection data and parameters calculated based on the detection data, in which:

DETAILED DESCRIPTION

The invention will now be described in detail with reference to the drawings showing embodiments thereof.

Figure 1:
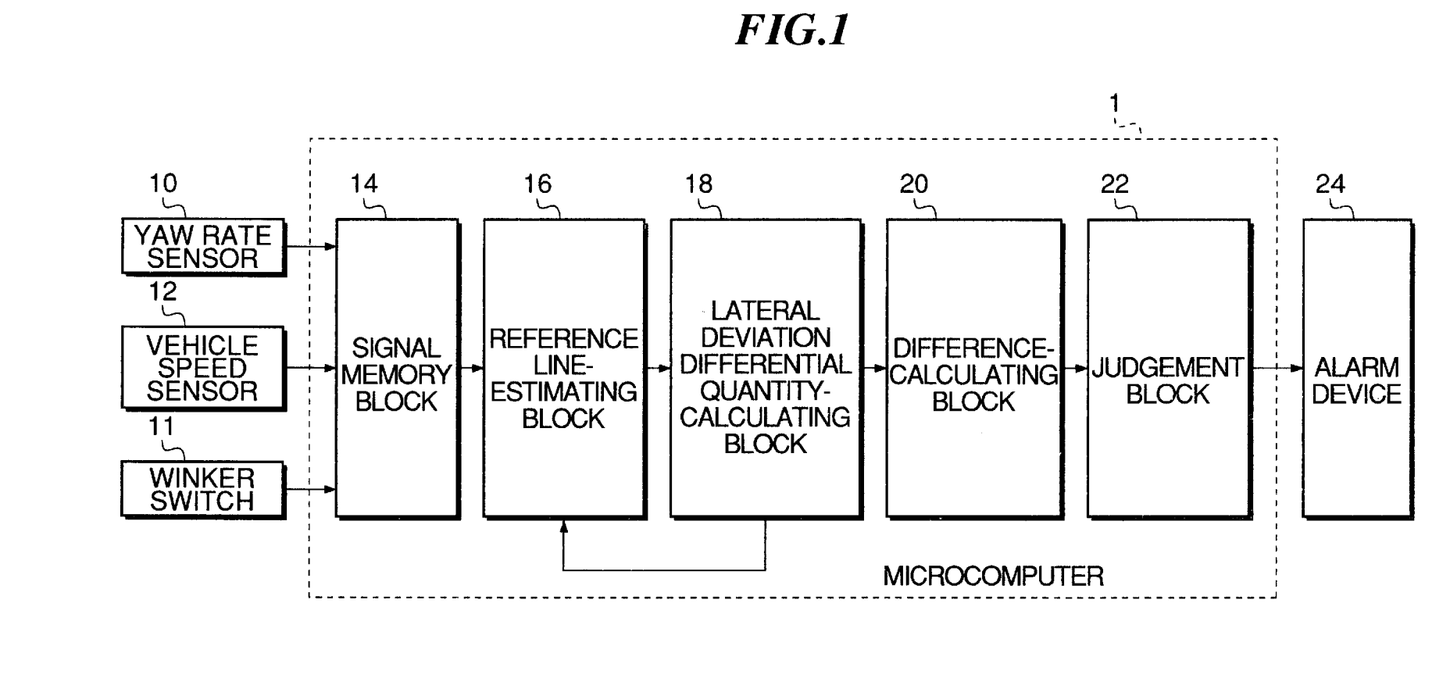
FIG. 1 is a block diagram showing the arrangement of a driving state-monitoring apparatus for an automotive vehicle, according to a first embodiment of the invention.

Referring first to FIG. 1, there is shown the arrangement of a driving state-monitoring apparatus for an automotive vehicle, according to a first embodiment of the invention. The apparatus is installed on the vehicle which is driven by a prime mover, such as an internal combustion engine and an electric motor, and is equipped with a steering handle or wheel. In the figure, reference numeral 1 designates a microcomputer which has an input to which are connected a yaw rate sensor 10 for detecting the yaw rate of the vehicle, a vehicle speed sensor 12 for detecting the traveling speed of the vehicle, and a winker switch 11 for detecting the driver's intention of changing the traveling lane. The microcomputer 1 has an output to which is connected an alarm device 24 for giving an alarm if necessary during monitoring of the driving state of the driver. The alarm device may be formed e.g. by a lamp, a buzzer, or a voice generator.

The microcomputer 1 has functions which are represented as functional blocks in FIG. 1, i.e. a signal memory block 14, a reference line-estimating block 16, a lateral deviation differential quantity-calculating block 18, a difference-calculating block 20, and a judgement block 22.

The signal memory block 14 stores input signals from the sensors 10, 12 and the switch 11, and updates yaw rate data and vehicle speed data obtained over a predetermined time period T1 (e.g. 30 seconds) before the present time whenever a predetermined time period (e.g. 10 seconds) elapses. The updated data are delivered to the reference line-estimating block 16.

Figure 2A:
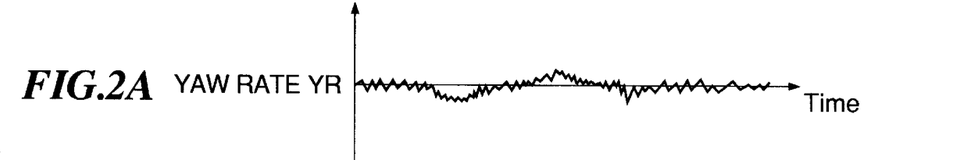
FIG. 2A shows changes in a yaw rate YR.
Figure 2B:
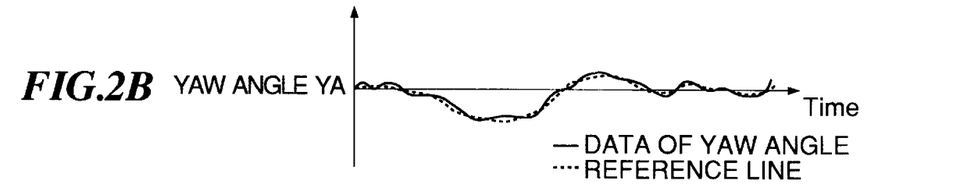
FIG. 2B shows changes in a yaw angle YA.

The reference line-estimating block 16 time-integrates the input yaw rate (FIG. 2A) into a yaw angle YA (FIG. 2B), and further calculates a reference line (indicated by the broken line in FIG. 2B), based on the yaw angle. Specifically, this calculation is carried out by a least-square method, which is well known, in the following manner:

Let it be assumed, e.g. that yaw angle values YA1, YA2, and YA3 were obtained at time points t1, t2, and t3, respectively. The reference line can be approximated by the following linear expressions:

YA1=b1+b2t1+e1
YA2=b1+b2t2+e2
YA3=b1+b2t3+e3 where e1 to e3 represent remaining differences, and terms b1 and b2 are determined such that the sum of the squares of the remaining differences e1 to e3 becomes the minimum. The reference line can also be approximated by the following quadratic expressions:

YA1=b1+b2t1+b3t1$^2$+e1
YA2=b1+b2t2+b3t2$^2$+e2
YA3=b1+b2t3+b3t3$^2$+e3 where terms b1 to b3 are determined such that the sum of the squares of the remaining differences e1 to e3 becomes the minimum.

Further, the reference line can be approximated by the following cubic expressions:

YA1=b1+b2t1+b3t1$^2$+b4t1$^3$+e1
YA2=b1+b2t2+b3t2$^2$+b4t2$^3$+e2
YA3=b1+b2t3+b3t3$^2$+b4t3$^3$+e3 where terms b1 to b4 are determined such that the sum of the squares of the remaining differences e1 to e3 becomes the minimum.

When the number of sampled data items is larger, the degree of expressions is further increased in a similar manner for more accurate approximation.

Figure 2C:
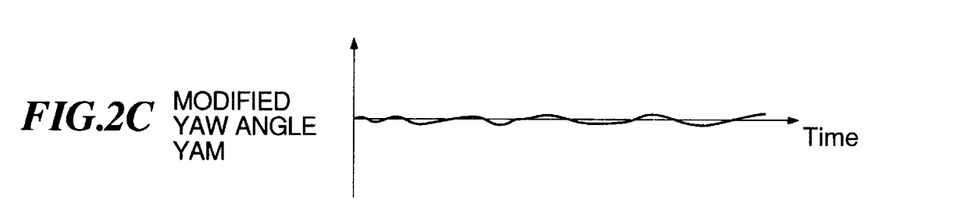
FIG. 2C shows changes in a modified yaw angle YAM.

In the present embodiment, first, the reference line is determined by the linear expressions, and then a modified yaw angle YAM (FIG. 2C) is calculated by subtracting a reference yaw angle corresponding to the reference line from the determined yaw angle YA. The calculated modified yaw angle YAM is delivered to the lateral deviation differential quantity-calculating block 18.

Figure 2D:
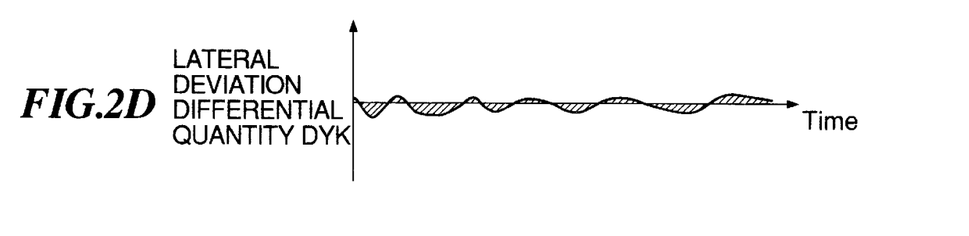
FIG. 2D shows changes in a lateral deviation differential quantity DYK.

The lateral deviation differential quantity-calculating block 18 calculates a lateral deviation differential quantity DYK (FIG. 2D) by applying the modified yaw angle YAM and the vehicle speed V to the following equation:

$$DYK = V \times \sin(YAM)$$

When the difference between the maximum value DYKMAX of the lateral deviation differential quantity DYK and the minimum value DYKMIN of the same is equal to or larger than a predetermined value α1, the order of approximation of the reference line is increased to again determine the reference line, based on which the lateral deviation differential quantity DYK is again calculated. This procedure is repeatedly carried out until (DYKMAX−DYKMIN) <α1 is fulfilled.

The difference-calculating block 20 calculates a difference ΔDIF1, based on the lateral deviation differential quantity DYK. The difference ΔDIF1 is calculated e.g. as the sum of the hatched areas (a value obtained by time-integrating the absolute value of the lateral deviation differential quantity DYK) shown in FIG. 2D. Alternatively, a standard deviation of the DYK value or the difference between the maximum value of the DYK value and the minimum value of the same may be used.

When the difference ΔDIF1 exceeds a predetermined value ΔDIFLIM1 and at the same time the winker switch 11 is not operated, it means that the vehicle has largely deviated from the reference line without the driver's intention of changing the traffic lane, and hence the judgement block 22 judges that the driving state of the driver is abnormal, thereby delivering a signal for instructing the alarm device 24 to give an alarm.

As described above, according to the present embodiment, the reference line is calculated based on the yaw angle YA detected, and the driving state of the driver is judged based on the difference ΔDIF1 which is indicative of a deviation from the reference line and calculated from the lateral deviation differential quantity DYK. Therefore, it is possible to accurately determine the driving state of the driver, irrespective of the road surface conditions and differences in driving skill between individual drivers. Further, according to the embodiment, an alarm is given in dependence on the operative state of the winker as well, which prevents an erroneous judgement as to abnormality of the driving state when a change of the course is intended by the driver.

Figure 3:
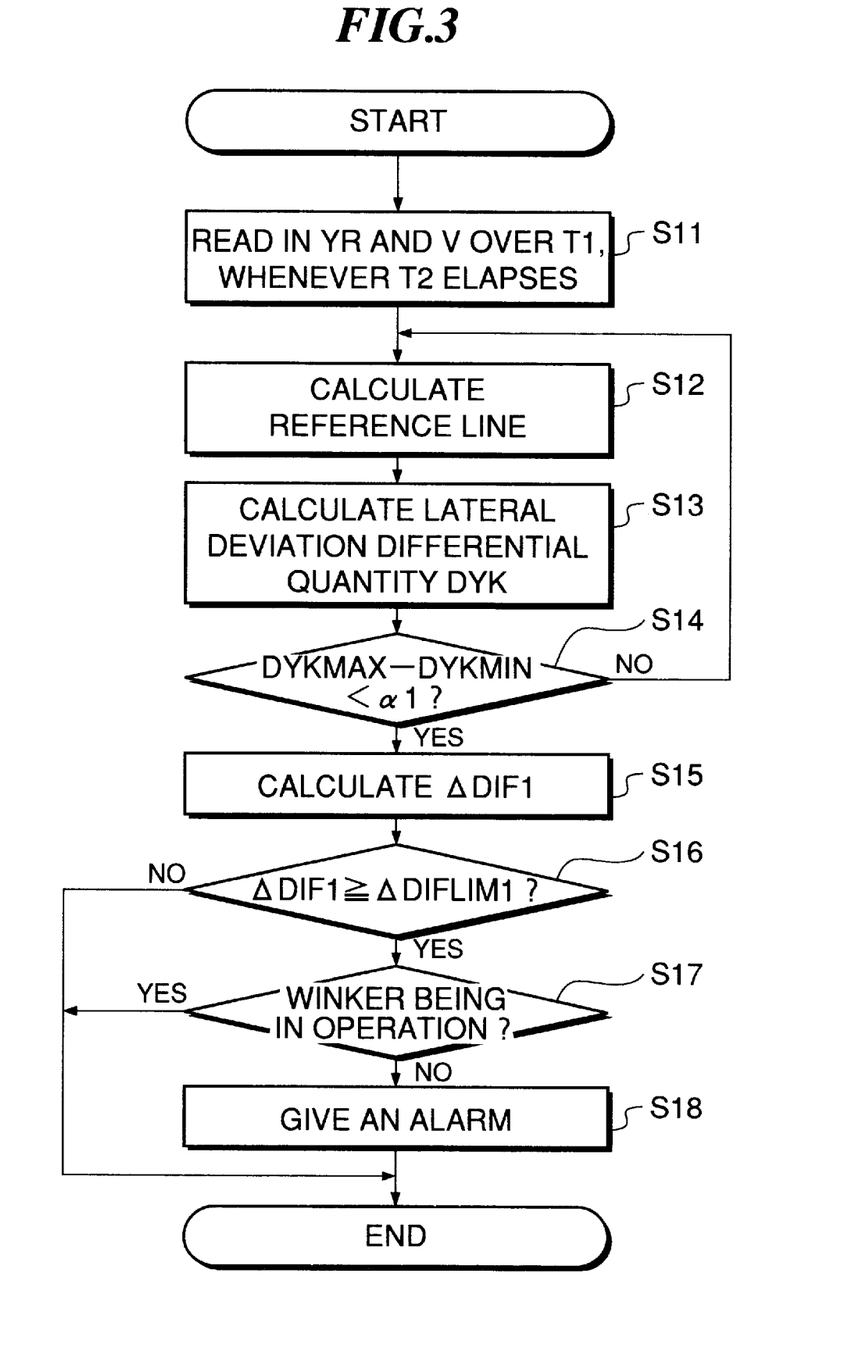
FIG. 3 is a flowchart showing a program for carrying out monitoring processing, which is executed by a microcomputer appearing in FIG. 1.

FIG. 3 shows a control processing routine executed by the microcomputer 1 for monitoring the driving state of the driver. The functions of the reference line-estimating block 16, the lateral deviation differential amount-calculating block 18, the difference-calculating block 20, and the judgement block 22 are implemented by the CPU of the microcomputer 1.

First, at a step S11, data of the yaw rate YR and the vehicle speed V detected over the predetermined time period T1 are read in whenever the predetermined time period T2 elapses. Then, the reference line and the lateral deviation differential quantity DYK are calculated by the use of the yaw rate Y data and the vehicle speed V data in the manners described hereinbefore at steps S12 and S13, respectively. At the following step S14, it is determined whether the difference between the maximum value DYKMAX of the lateral deviation differential quantity DYK and the minimum value DYKMIN of the same is smaller than the predetermined value $\alpha 1$. If (DYKMAX−DYKMIN)$\geq \alpha 1$, the program returns to the step S12, wherein the order of approximation is increased by one order to again calculate the reference line. This procedure is repeatedly carried out until the answer to the question of the step S14 becomes affirmative (YES).

If (DYKMAX−DYKMIN)$<\alpha 1$ is satisfied at the step S14, the program proceeds to a step S15, wherein the difference $\Delta$DIF1 is calculated. Then, it is determined at a step S16 whether or not the difference $\Delta$DIF1 is equal to or larger than the predetermined value $\Delta$DIFLIM1. If $\Delta$DIF1$\geq \Delta$DIFLIM1, it is determined at a step S17 whether or not the winker is being operated. If $\Delta$DIF1 $<\Delta$DIFLIM1 or if the winker is being operated, the program is immediately terminated, whereas if $\Delta$DIF1$\geq \Delta$DIFLIM1 and at the same time the winker is not being operated, it is determined that the driving state of the driver is abnormal, and a signal is delivered for instructing the alarm device 24 to give an alarm.

Figure 4:
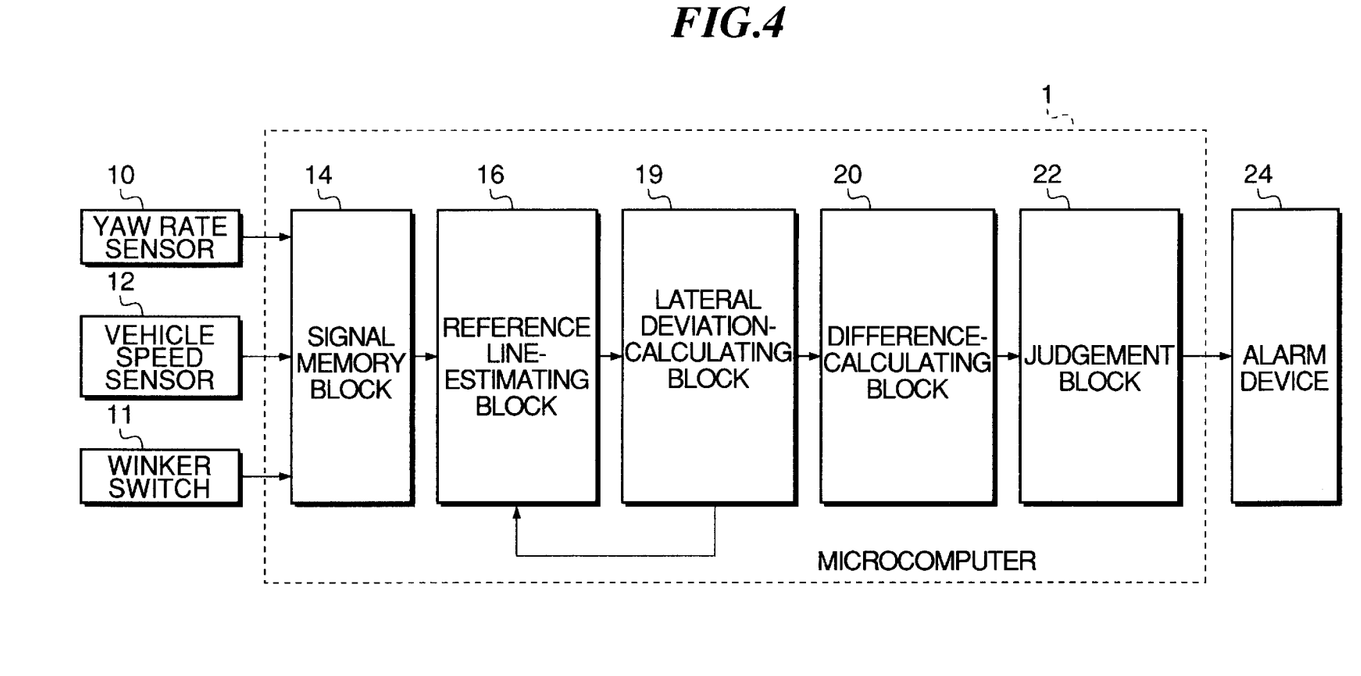
FIG. 4 is a block diagram showing the arrangement of a driving state-monitoring apparatus for an automotive vehicle, according to a second embodiment of the invention.

FIG. 4 shows the arrangement of a driving state-monitoring apparatus for an automotive vehicle, according to a second embodiment of the invention. The monitoring apparatus according to this embodiment is distinguished from the first embodiment described above only in that it is provided with a lateral deviation-calculating block 19 in place of the lateral deviation differential quantity-calculating block 18, and the difference-calculating block 20 calculates the deviation not based on the lateral deviation differential quantity but based on the transverse deviation.

Figure 5:
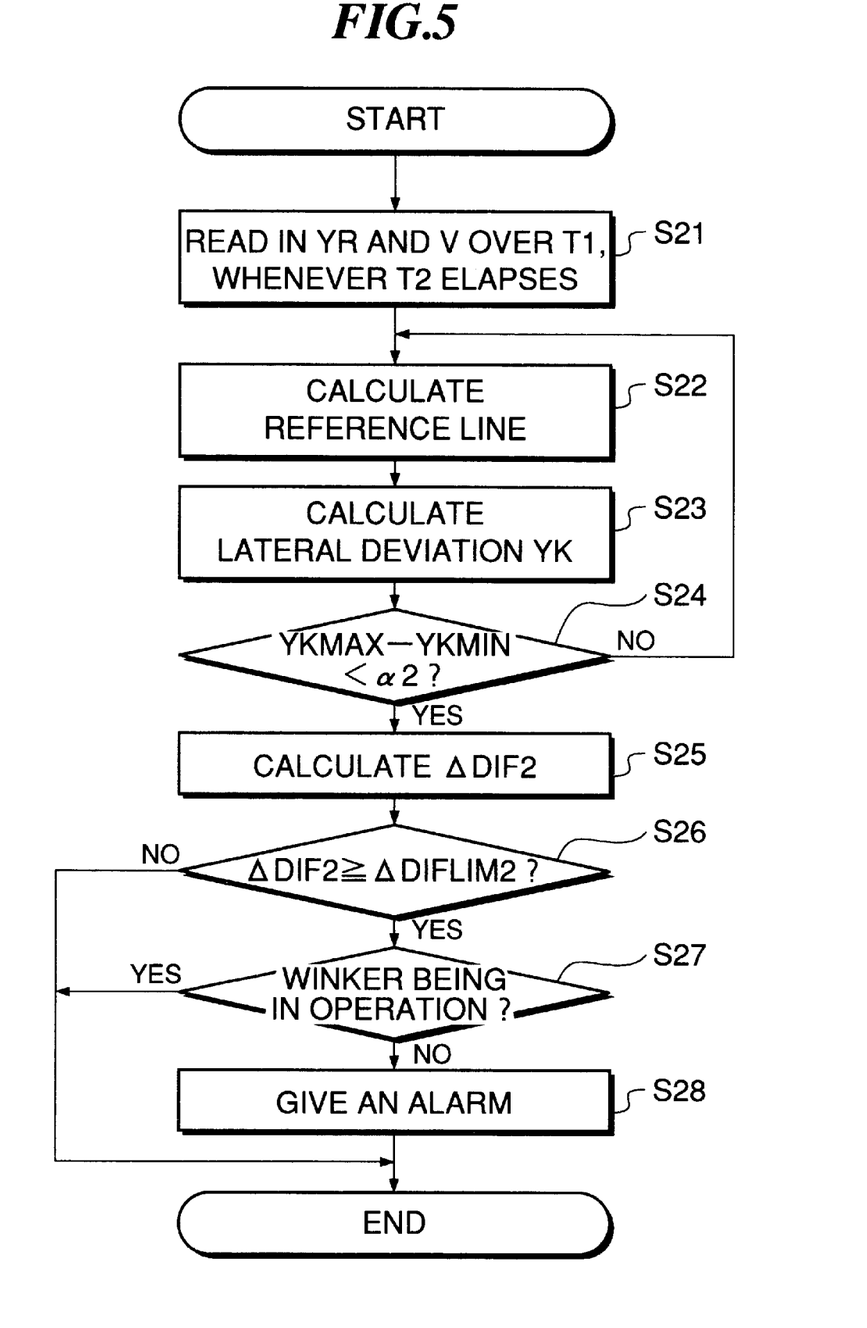
FIG. 5 is a flowchart showing a program for carrying out monitoring processing, which is executed by a microcomputer appearing in FIG. 4.

FIG. 5 shows a control processing routine executed by the microcomputer 1 of the present embodiment for monitoring the driving state of the driver. The operation of the present embodiment (FIG. 4) will be described with reference to the FIG. 5 routine.

Figure 2E:
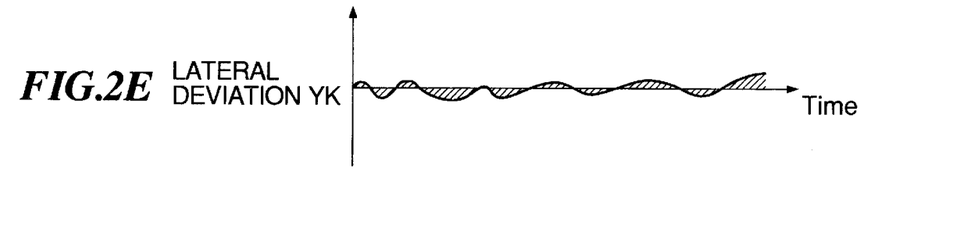
FIG. 2E shows changes in a lateral deviation YK.

First, at steps S21 and S22, data of the yaw rate YR and the vehicle speed V are read in similarly to the steps S11 and S12 of FIG. 3, to thereby calculate the reference line. At a step S23, the lateral deviation differential quantity DYK is calculated based on the modified yaw angle YAM and the vehicle velocity V in the manner described before, and then the lateral deviation differential quantity DYK is subjected to time integration, i.e. integrated with respect to time, to thereby calculate a lateral deviation YK (FIG. 2E).

Then, it is determined at a step S24 whether or not the difference between the maximum value YKMAX of the transverse deviation YK and the minimum value YKMIN of the same is smaller than a predetermined value $\alpha 2$. If (YKMAX−YKMIN)$\geq \alpha 2$, the program returns to the step S22, wherein the order of approximation is increased by one order to again calculate the reference line. This procedure is repeatedly carried out until the answer to the question of the step S24 becomes affirmative (YES).

If (YKMAX−YKMIN)$<\alpha 2$ is fulfilled at the step S24, the program proceeds to a step S25, wherein a difference $\Delta$DIF2 is calculated. The difference $\Delta$DIF2 is calculated e.g. as the sum of the hatched areas shown in FIG. 2E which is obtained by time-integrating the absolute value of the lateral deviation YK. Alternatively, a standard deviation of the YK value or the difference between the maximum of the YK value and the minimum of the same may be used.

Then, it is determined at a step S26 whether or not the difference $\Delta$DIF2 is equal to or larger than a predetermined value $\Delta$DIFLIM12. If $\Delta$DIF2$\geq \Delta$DIFLIM2, it is determined at a step S27 whether or not the winker is being operated. If $\Delta$DIF2$<\Delta$DIFLIM2 or if the winker is being operated, the program is immediately terminated, whereas if $\Delta$DIF2$\geq \Delta$DIFLIM2 and at the same time the winker is not being operated, it is determined that the driving state of the driver is abnormal, and a signal is delivered to instruct the alarm device 24 to give an alarm.

As described above, according to the present embodiment, the reference line is calculated based on the yaw angle YA detected, and the driving state of the driver is determined based on the difference $\Delta$DIF2 calculated from the lateral deviation YK, i.e. a deviation of the vehicle from the reference line. Therefore, it is possible to provide similar results to those in the first embodiment.

Figure 6:
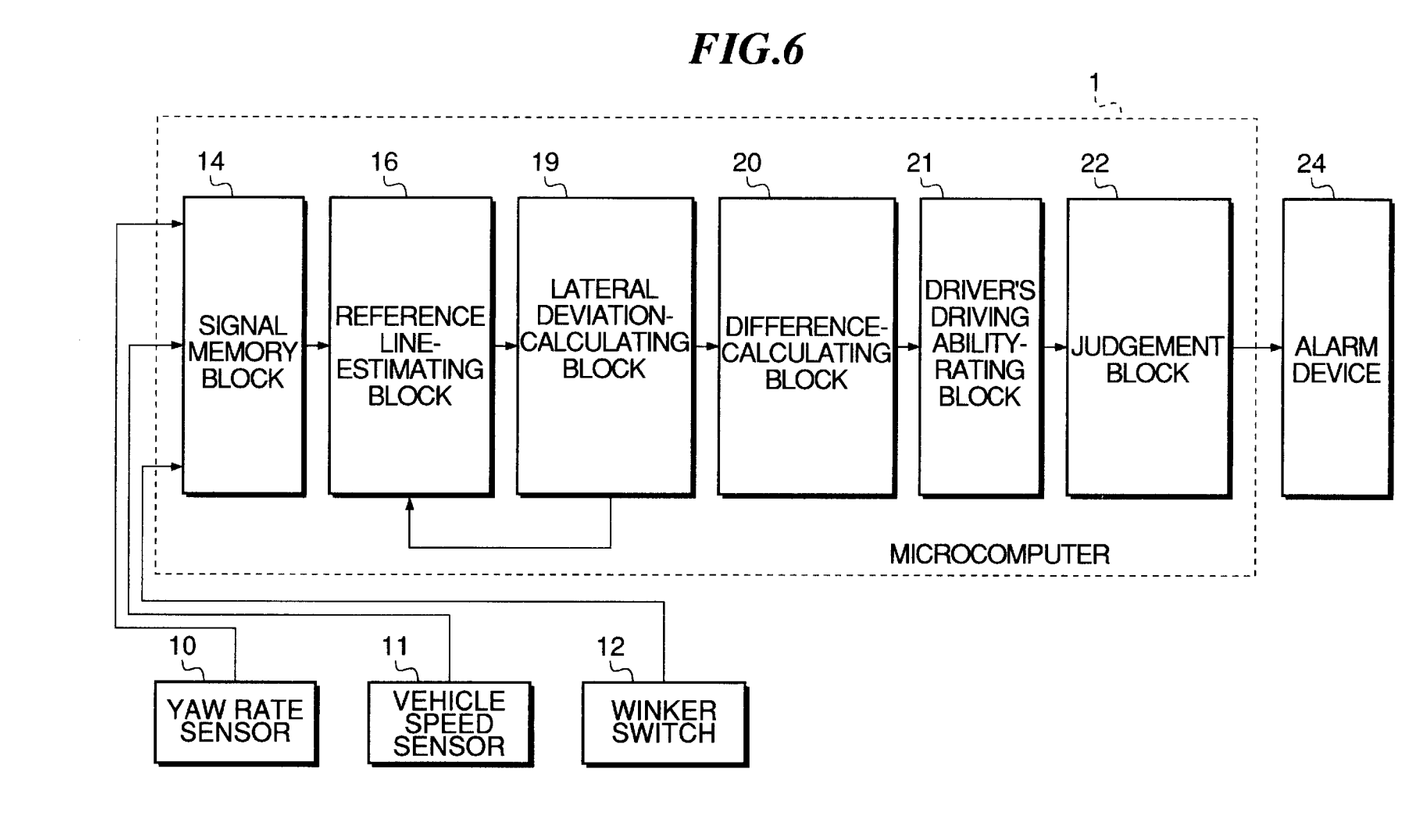
FIG. 6 is a block diagram showing the arrangement of a driving state-monitoring apparatus for an automotive vehicle, according to a third embodiment of the invention.

FIG. 6 shows the arrangement of a driving state-monitoring apparatus for an automotive vehicle, according to a third embodiment of the invention. The monitoring apparatus according to this embodiment is distinguished from the second embodiment described above only in that it is additionally provided with a driver's driving ability-rating block 21 interposed between the difference-calculating block 20 and the judgement block 22.

Figure 7:
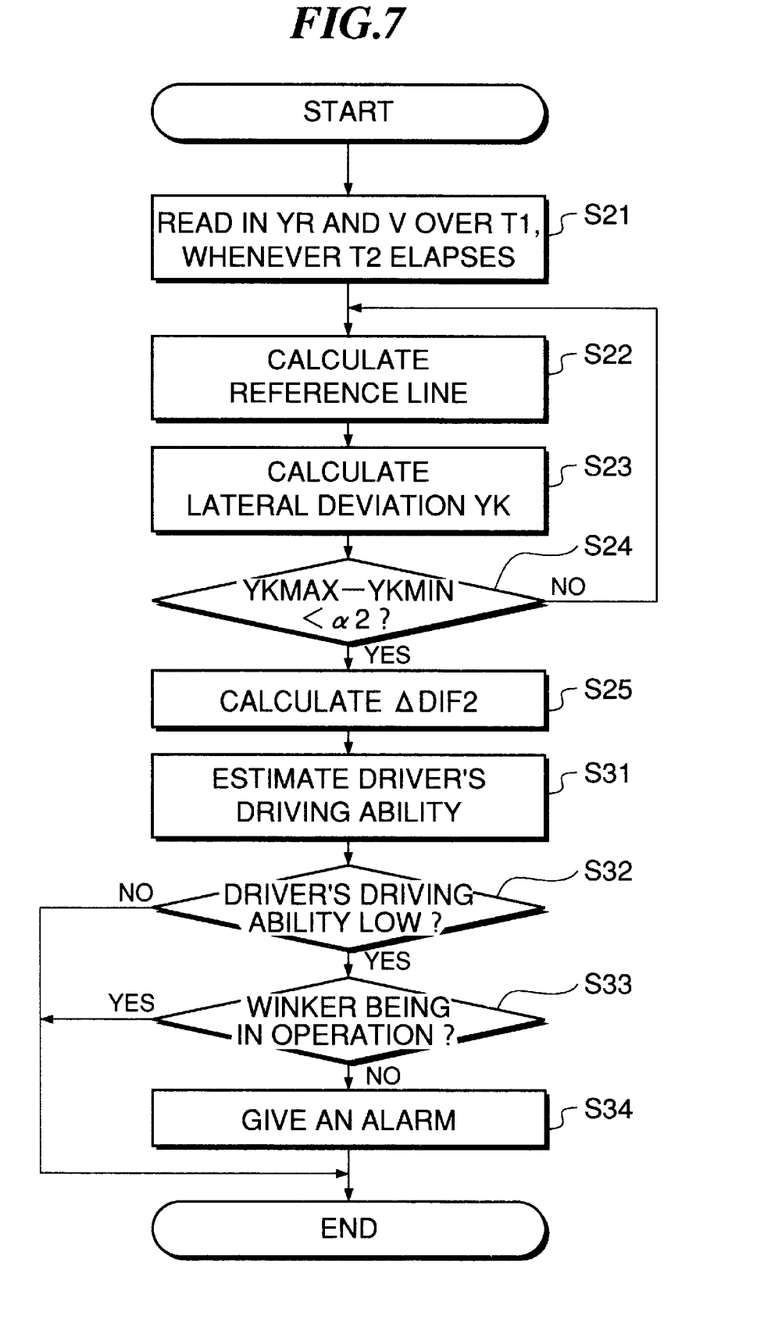
FIG. 7 is a flowchart showing a program for carrying out monitoring processing, which is executed by a microcomputer appearing in FIG. 6.

FIG. 7 shows a control processing routine executed by the microcomputer 1 of the present embodiment for monitoring the driving state of the driver. Steps S21 to S25 in FIG. 7 are identical to the steps S21 to S25 of FIG. 5, description of which is therefore omitted.

At a step S31, the driver's driving ability is rated based on the difference $\Delta$DIF2 calculated at the step S25. This rating is carried out in the following manner.

Figure 8:
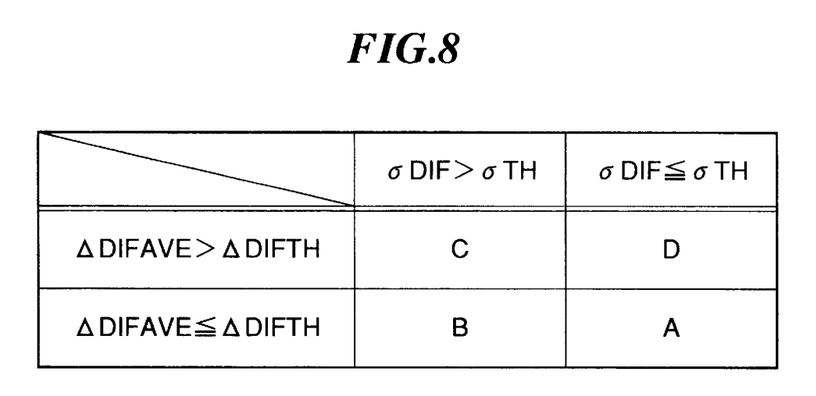
FIG. 8 shows a map for use in determining the level of the driver's driving ability.

First, the difference $\Delta$DIF2 is calculated m times (e.g. 4 times), based on respective m pieces of data of the yaw rate YR and respective m pieces of data of the vehicle speed V which have been sampled at different sampling time points from each other. An average value $\Delta$DIFAVE of the m values of the difference $\Delta$DIF2 and a standard deviation $\sigma$DIF thereof are calculated. Then, the driver's driving ability is estimated at one of levels A to D as shown in FIG. 8, depending on whether the average value $\Delta$DIFAVE is larger than a predetermined value $\Delta$DIFTH and whether the standard deviation $\sigma$DIF is larger than a predetermined threshold value $\sigma$TH. If $\Delta$DIFAVE$\leq \Delta$DIFTH and at the same time $\sigma$DIF$\leq \sigma$TH, which means that the difference is small on the average and undergoes little variation, the driver's driving ability is estimated to be the highest (level A). On the other hand, if $\Delta$DIFAVE$>\Delta$DIFTH and at the same time $\sigma$DIF$\leq \sigma$TH, which means that the difference is large on the average and at the same time undergoes little variation, the driver's driving ability is estimated to be the lowest (level D). Further, if $\sigma$DIF$>\sigma$TH, it is presumed that the driver has higher driving ability as the average value $\Delta$DIFAVE is smaller. Therefore, in this case, if $\Delta$DIFAVE$\leq \Delta$DIFTH, the driver's driving ability is estimated at the level B, while if $\Delta$DIFAVE$>\Delta$DIFTH, it is estimated at the level C.

Figure 9:
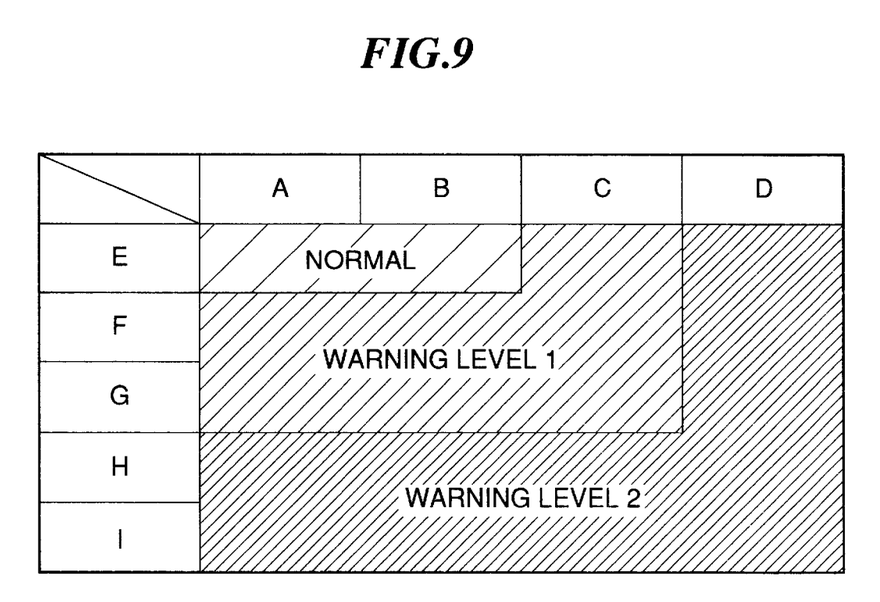
FIG. 9 shows another map for use in determining the level of the driver's driving ability.

Further, the number NOV (=0 to m) of ones of the m $\Delta$DIF2 values which exceed a predetermined value is determined, and based on the NOV value, the driver's driving ability is estimated at one of levels of E to I as shown in FIG. 9. More specifically, if m=4, the driver's driving ability is rated at levels E, F, G, H, I, according to NOV=0, 1, 2, 3, 4, respectively.

Then, the driver's driving ability is synthetically determined based on the levels A to D and E to I explained above. More specifically, if the driver's driving ability is at the level A or B and at the same time at the level E, it is judged that the driver's driving ability is normal. If the driver's driving ability is at the level A or B, and at the same time at the level F or G, or at the level C and at the same time at the level E, F, or G, it is judged that the driver's driving ability is at a warning level 1, and if the same is at the level A, B or C and at the same time at the level H or I, or at the level D, it is judged that the driver's driving ability is at a warning level 2.

In this way, the driver's driving ability is determined based on an average value of a plurality of values of the difference ΔDIF2 and the degree of variation between them, whereby it is possible to accurately determine the driver's driving ability.

Referring again to FIG. 7, it is determined at a step S32 whether or not the driver's driving ability is low, more specifically, whether or not the driver's driving ability was rated at the warning level 1 or the warning level 2 at the step S31. If the answer to this question is affirmative (YES), it is determined at a step S33 whether or not the winker is being operated. If the driver's driving ability is neither at the warning level 1 nor at the warning level 2, or the winker is being operated, the program is immediately terminated. On the other hand, if the driver's driving ability is at the warning level 1 or the warning level 2, and at the same time the winker is not being operated, it is judged that the driving state of the driver is abnormal, and a signal is delivered to the alarm device 24 to give an alarm.

Here, if the driver's driving ability is at the warning level 2, it is preferred, for example, that the alarming is made by a larger sound than when it is at the warning level 1, or by lighting an alarm lamp and sounding a buzzer concurrently. Further, a fail-safe operation, such as deceleration of the vehicle, may be employed if the driver's driving ability is at the warning level 2.

As described above, according to the third embodiment, by determining the driver's driving ability based on an average value of a plurality of values of the difference amount ΔDIF2 and the variation between them, it is possible to determine or rate the driver's driving ability more accurately, which makes it possible to carry out an alarming operation, and more desirably, a fail-safe action, in a more appropriate manner.

Further, although in the above described embodiment, the driver is cautioned by appealing to his sight and/or hearing, this not limitative, but means of directly acting on the driver may be employed, e.g. by vibrating the driver's seat, or by applying tension to the seat belt, or by emitting a perfume, or by changing the operating condition of an air conditioner provided in the vehicle. This ensures that the driver is cautioned of his degraded driving ability in a more positive manner.

Further, although in the above embodiments, the yaw rate is detected by the yaw rate sensor 10, this is not limitative, but the yaw rate may be otherwise calculated based on outputs from wheel speed sensors and the steering angle sensor, or based on outputs from a steering angle sensor for detecting the steering angle of the steering wheel and a lateral acceleration sensor, etc.

Further, although in the above embodiments, the reference line is estimated from the yaw angle YA, this is not limitative, but it may be estimated from the yaw rate YR, or the lateral deviation YK.

Although there have been described what are at present considered to be the preferred embodiments of the invention, it will be understood that variations and modifications may be made thereto within the spirit and essence of the invention. The scope of the invention is indicated by the appended claims, rather than by the foregoing discussion.

What is claimed is:

1. A driving state-monitoring apparatus for an automotive vehicle, for monitoring a driving state of a driver of said automotive vehicle, comprising:

behavior parameter-detecting means for detecting a behavior parameter indicative of an amount of behavior related to at least one of yawing movement and lateral movement of said automotive vehicle;

vehicle speed-detecting means for detecting a speed of said automotive vehicle;

behavior reference parameter-setting means for setting a behavior reference parameter based on changes in said behavior parameter;

lateral deviation behavior amount-calculating means for calculating a lateral deviation behavior amount of said automotive vehicle, based on said behavior parameter, said behavior reference parameter, and said speed of said automotive vehicle;

driving state-determining means for determining whether or not said driving state of said driver is normal, based on said lateral deviation behavior amount; and abnormality-determining means responsive to at least a determination by said driving state-determining means that said driving state of said driver is not normal, for determining that said driving state of said driver is abnormal.

2. A driving state-monitoring apparatus according to claim 1 wherein said behavior parameter detecting means detects at least one of said yawing movement and said lateral movement of said automotive vehicle.

3. A driving state-monitoring apparatus for an automotive vehicle, for monitoring a driving state of a driver of said automotive vehicle, comprising:

behavior parameter-detecting means for detecting a behavior parameter indicative of an amount of behavior related to at least one of yawing movement and lateral movement of said automotive vehicle;

vehicle speed-detecting means for detecting a speed of said automotive vehicle;

behavior reference parameter-setting means for setting a behavior reference parameter based on changes in said behavior parameter;

lateral deviation behavior amount-calculating means for calculating a lateral deviation amount of said automotive vehicle, based on said behavior parameter, said behavior reference parameter, and said speed of said automotive vehicle;

driving state-determining means for determining whether or not said driving state of said driver is normal, based on said lateral deviation behavior amount;

abnormality-determining means responsive to at least a determination by said driving state-determining means that said driving state of said driver is not normal, for determining that said driving state of said driver is abnormal; and lane changing intention-determining means for determining whether or not said driver intends to change a lane on which said automotive vehicle is traveling, and wherein said abnormality-determining means determines that said driving state of said driver is abnormal, when it is determined by said lane changing intention-determining means that said driver does not intend to change said lane, and at the same time it is determined by said driving state-determining means that said driving state of said driver is not normal.

4. A driving state-monitoring apparatus according to claim 3, wherein said driving state-determining means determines whether or not said driving state of said driver is normal, based on a plurality of data obtained at different measuring time points.

5. A driving state-monitoring apparatus according to claim 3, including control means for causing said behavior reference parameter-setting means to again set or correct said behavior reference parameter, depending on variation in said lateral deviation behavior amount calculated by said lateral deviation behavior amount-calculating means.

6. A driving state-monitoring apparatus according to claim 3, including alarm means responsive to said determination by said abnormality-determining means that said driving state of said driver is abnormal, for giving an alarm.

7. A driving state-monitoring apparatus according to claim 3, including vehicle speed-limiting means responsive to said determination by said abnormality-determining means that said driving state of said driver is abnormal, for limiting said speed of said automotive vehicle.

8. A driving state-monitoring apparatus according to claim 3, wherein said automotive vehicle includes an equipment installed on said automotive vehicle for directly acting on said driver, said apparatus including vehicle equipment control means responsive to said determination by said abnormality-determining means that said driving state of said driver is abnormal, for controlling said equipment.

9. A driving state-monitoring apparatus for an automotive vehicle, for monitoring a driving state of a driver of said automotive vehicle, comprising:
behavior parameter-detecting means for detecting a behavior parameter indicative of an amount of behavior related to at least one of yawing movement and lateral movement of said automotive vehicle;
vehicle speed-detecting means for detecting a speed of said automotive vehicle;
behavior reference parameter-setting means for setting a behavior reference parameter based on changes in said behavior parameter;
lateral deviation behavior amount-calculating means for calculating a lateral deviation amount of said automotive vehicle, based on said behavior parameter, said behavior reference parameter, and said speed of said automotive vehicle;
driving state-determining means for determining whether or not said driving state of said driver is normal, based on said lateral deviation behavior amount;
abnormality-determining means responsive to at least a determination by said driving state-determining means that said driving state of said driver is not normal, for determining that said driving state of said driver is abnormal; and
said driving state-determining means including means for estimating the driver's driving ability based on said behavior parameter.

10. A driving state-monitoring apparatus according to claim 9, wherein said estimating means estimates the driver's driving ability based on a plurality of said lateral deviation behavior amounts calculated over a period of time.

11. A driving state-monitoring apparatus according to claim 9, wherein said driving state-determining means determines that said driving state of the driver is not normal when it is estimated that the driver's driving ability is poor.

12. A driving state-monitoring apparatus for an automotive vehicle, for monitoring a driving state of a driver of said automotive vehicle, comprising:
behavior parameter-detecting means for detecting a behavior parameter indicative of an amount of behavior related to at least one of yawing movement and lateral movement of said automotive vehicle;
vehicle speed-detecting means for detecting a speed of said automotive vehicle;
behavior reference parameter-setting means for setting a behavior reference parameter based on changes in said behavior parameter;
lateral deviation behavior amount-calculating means for calculating a lateral deviation amount of said automotive vehicle, based on said behavior parameter, said behavior reference parameter, and said speed of said automotive vehicle;
driving state-determining means for determining whether or not said driving state of said driver is normal, based on said lateral deviation behavior amount;
abnormality-determining means responsive to at least a determination by said driving state-determining means that said driving state of said driver is not normal, for determining that said driving state of said driver is abnormal; and
means for detecting a driver's intention to deviate from a normal driving state; and
wherein said abnormality-determining means determines that the driving state of said driver is abnormal, when it is detected by said driver's intention detecting means that the driver does not intend to deviate from the normal driving state, and at the same time it is determined by said driving state-determining means that said driving state of the driver is not normal.

13. A driving state-monitoring apparatus for monitoring a driving state of a driver of a vehicle, comprising:
means for detecting a speed of the vehicle;
means for detecting a vehicle behavior parameter indicative of an amount of behavior related to at least one of yawing movement and lateral movement of the vehicle;
means for setting a behavior reference parameter based on changes in said behavior parameter;
means for calculating a lateral deviation behavior amount of the vehicle based on said behavior parameter, said behavior reference parameter and the speed of the vehicle; and
means for determining whether the driving state of the driver is abnormal based on said lateral deviation behavior amount.

14. A driving state-monitoring apparatus for monitoring a driving state of a driver of a vehicle, comprising:
means for detecting a speed of the vehicle;
means for detecting a vehicle behavior parameter indicative of an amount of behavior related to at least one of yawing movement and lateral movement of the vehicle;
means for setting a behavior reference parameter based on changes in said behavior parameter;
means for calculating a lateral deviation behavior amount of the vehicle based on said behavior parameter, said behavior reference parameter and the speed of the vehicle;

means for determining whether the driving state of the driver is abnormal based on said lateral deviation behavior amount;

means for estimating the driver's driving ability based on a plurality of said lateral deviation behavior amounts calculated over a period of time; and said driving state-determining means determines whether the driving state of the driver is abnormal further based on the estimated driving ability of the driver.

15. A driving state-monitoring apparatus according to claim 13, further including means for providing at least one of a driver warning and a vehicle speed control when said driving state-determining means determines that the driving state of the driver is abnormal.

16. A driving state-monitoring apparatus according to claim 13, wherein said driving state-determining means determines whether the driving state of the driver is abnormal based on a plurality of said lateral deviation behavior amounts calculated over a period of time.

17. A driving state-monitoring apparatus according to claim 13, further including control means for causing said behavior reference parameters setting means to set a new behavior reference parameter depending on a variation in said lateral deviation behavior amount calculated over a period of time.

18. A driving state-monitoring apparatus according to claim 17, wherein said control means causes said behavior reference parameter setting means to set a different behavior reference parameter when said variation exceeds a predetermined value.

19. A driving state-monitoring apparatus for monitoring a driving state of a driver of a vehicle, comprising:

means for detecting a speed of the vehicle;

means for detecting a vehicle behavior parameter indicative of an amount of behavior related to at least one of yawing movement and lateral movement of the vehicle;

means for setting a behavior reference parameter based on changes in said behavior parameter;

means for calculating a lateral deviation behavior amount of the vehicle based on said behavior parameter, said behavior reference parameter and the speed of the vehicle;

means for determining whether the driving state of the driver is abnormal based on said lateral deviation behavior amount;

means for determining whether the driver intends to deviate from a lane on which the vehicle is traveling; and said driving state-determining means determines whether the driving state of the driver is abnormal further based on an output of said driver intention-determining means.

20. A driving state-monitoring apparatus according to claim 19, further including means for estimating the driver's driving ability based on a plurality of said lateral deviation behavior amounts calculated over a period of time, and said driving state-determining means determines whether the driving state of the driver is abnormal further based on the estimated driving ability of the driver.

* * * * *

UNITED STATES PATENT AND TRADEMARK OFFICE
CERTIFICATE OF CORRECTION

PATENT NO. : 6,278,362 B1
DATED : August 21, 2001
INVENTOR(S) : Yoshikawa et al.

It is certified that error appears in the above-identified patent and that said Letters Patent is hereby corrected as shown below:

Column 6,
Line 11, change "$\Delta DIFLIM12$" to -- $\Delta DIFLIM2$ --.

Column 11,
Line 22, change "parameters" to -- parameter --.

Signed and Sealed this

Twenty-third Day of April, 2002

Attest:

Attesting Officer

JAMES E. ROGAN
*Director of the United States Patent and Trademark Office*